Oct. 21, 1952  H. A. MATHEWS ET AL  2,615,080
SOUND INDICATOR AND FLUID LEVEL INDICATOR FOR WELLS
Filed Dec. 2, 1948  3 Sheets-Sheet 1
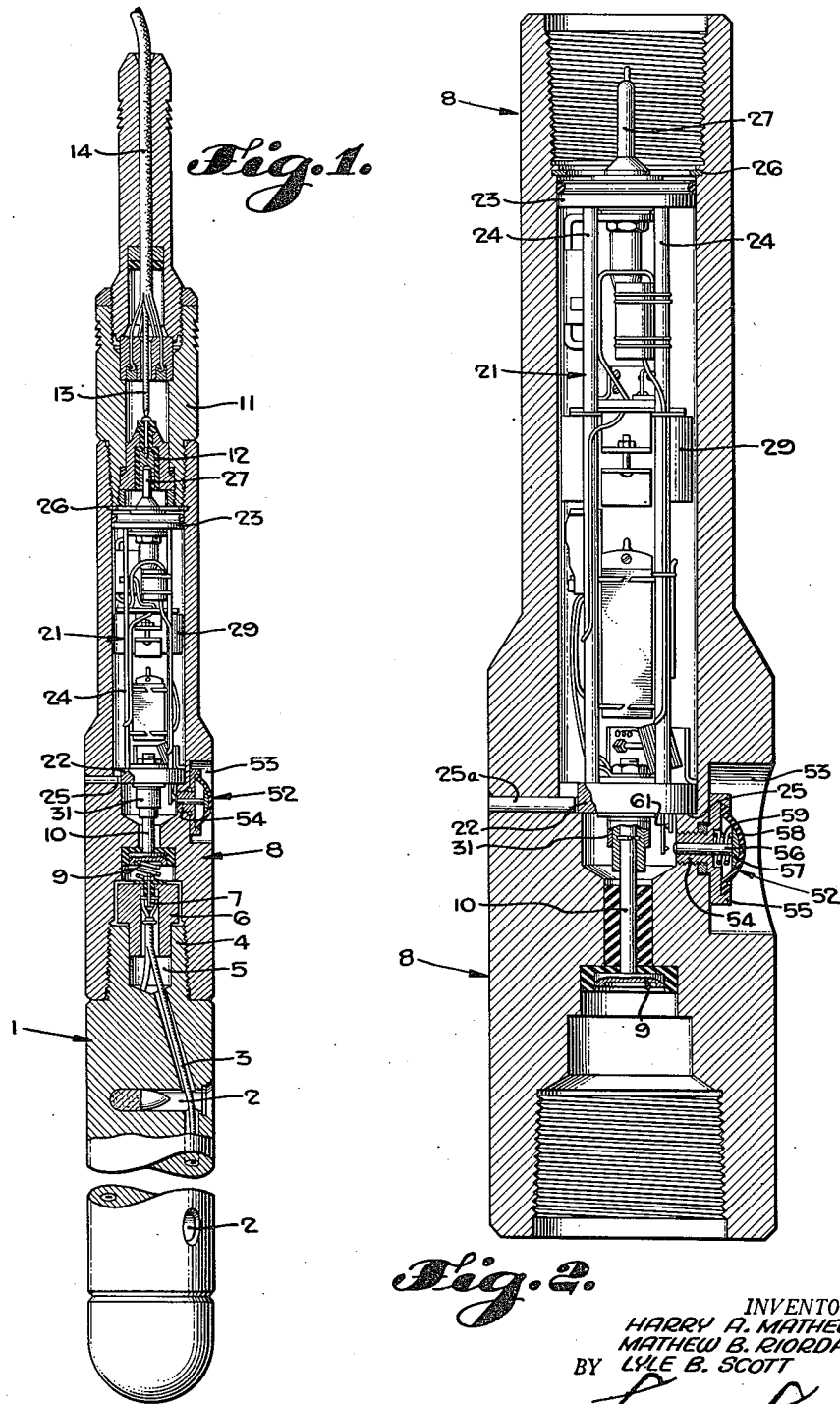
INVENTORS
HARRY A. MATHEWS
MATHEW B. RIORDAN, JR.
BY LYLE B. SCOTT
Lyon & Lyon
ATTORNEYS Oct. 21, 1952  H. A. MATHEWS ET AL  2,615,080
SOUND INDICATOR AND FLUID LEVEL INDICATOR FOR WELLS
Filed Dec. 2, 1948  3 Sheets-Sheet 2

INVENTORS
HARRY A. MATHEWS
MATHEW B. RIORDAN, JR
LYLE B. SCOTT
BY
Lyon & Lyon
ATTORNEYS Oct. 21, 1952     H. A. MATHEWS ET AL     2,615,080
SOUND INDICATOR AND FLUID LEVEL INDICATOR FOR WELLS
Filed Dec. 2, 1948     3 Sheets-Sheet 3
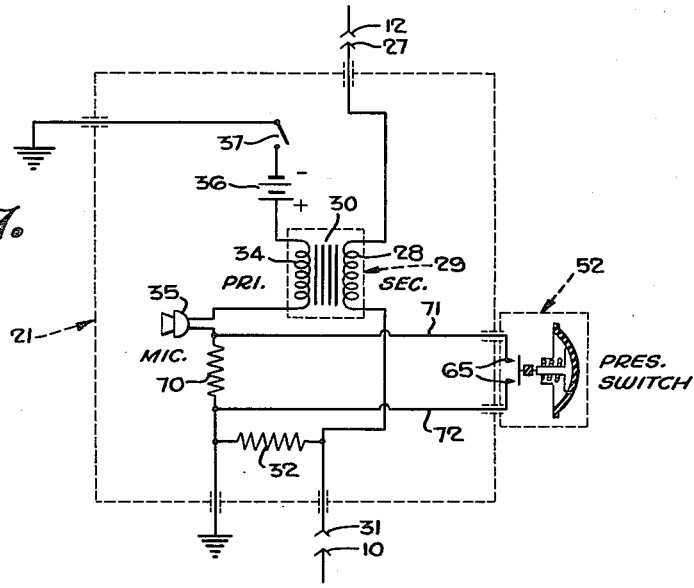
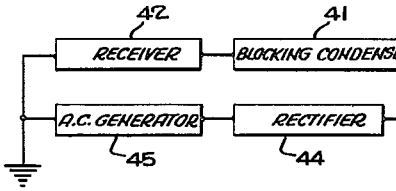
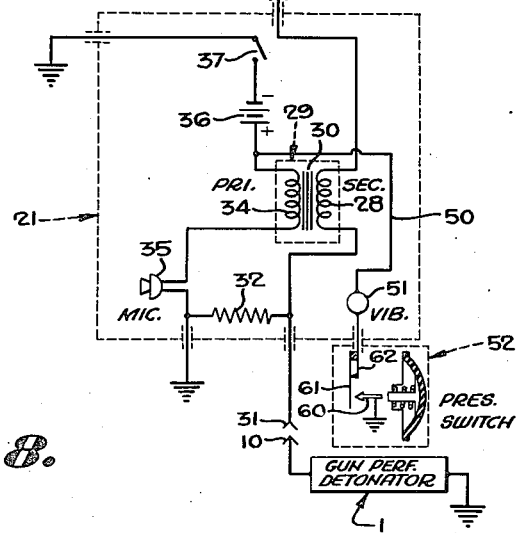
INVENTORS
HARRY A. MATHEWS
MATHEW B. RIORDAN, JR.
BY LYLE B. SCOTT
ATTORNEYS Patented Oct. 21, 1952

2,615,080

UNITED STATES PATENT OFFICE 2,615,080

SOUND INDICATOR AND FLUID LEVEL INDICATOR FOR WELLS

Harry A. Mathews, Garvey, Mathew B. Riordan, Jr., Bell, and Lyle B. Scott, South Gate, Calif., assignors to Byron Jackson Co., Vernon, Calif., a corporation of Delaware Application December 2, 1948, Serial No. 63,102

3 Claims. (Cl. 177—311)

This application is a continuation-in-part of application Serial No. 760,662, entitled "Sound Detector and Fluid Level Indicator for Wells," filed July 12, 1947 by Mathews, Riordan, Jr., and Scott, now abandoned.

This invention relates generally to tools adapted to be lowered into a well bore and is directed particularly to a combined sound detector and fluid level indicator for use therewith.

When manipulating a well tool, for example, a gun perforator, within a well bore, it is very desirable to have a surface indication of any noise produced by the tool as it is lowered or raised in the well. Thus the operator can hear the clicking sounds made by a gun perforator as it bounces and jostles against the walls of the well casing, also a characteristic sound made when the tool hits a shoulder as it passes from a larger to a smaller sized casing, and a loud sound caused by the gun perforator striking the side of the casing due to the violent reaction to firing. An absence of sound would indicate that the gun has hung up in the well. It is evident that an operator furnished with an indication of such subsurface noises is enabled to manipulate the well tool with the utmost efficiency.

Likewise, it is very desirable when manipulating a well tool within a well bore containing liquid to be able to obtain an instantaneous surface indication at the moment such tool encounters the level of the liquid. This information is especially sought in the operation of a gun perforator wherein the liquid level may vary substantially during such operation. These changes in the liquid level often serve as a measure of the success or failure of the gun perforating operation, and having immediate access to this information enables the operator to either continue the perforating operation or else withdraw the tool from the bore. In the event that the perforating operation is successful and the liquid enters the bore at a dangerously rapid rate, the operator can relay this message to the other members of the crew in time for them to take proper precautions against a well blow-out.

To the best of our knowledge, this invention marks the first time that the advantages of a sound detector and a fluid level indicator have been combined in one unit, utilizing a single electrical circuit and common electrical elements. This arrangement provides a unit that is economical of space and cost, and also one permitting ready accessibility when maintenance is required. Further, the operator is required to manipulate but one set of controls and signal receiving means in order to obtain an indication of well bore conditions; this is a very important consideration in view of the number and the complexity of instruments and controls to which he must devote his attention.

In view of the preceding discussion, it is to be noted that a principal object of this invention is to provide a combined sound detector and fluid level indicator for well tools whereby a continuous indication of any subsurface noise produced by such tool as it is raised, lowered or manipulated in the well bore is obtained at the surface of the well; the apparatus being so arranged as to produce a distinctive signal when the well tool enters or emerges from any liquid contained in the well.

Another object is to provide a device of this character whereby the electrical signals created therein by the subsurface noise of the well tool for transmission to a surface receiver are distinctively altered upon submergence of the tool below the surface of the well liquid, such alteration being discontinued upon emergence of the tool therefrom.

A further object is to provide a device which is particularly adapted for use in conjunction with electrically operated well tools such as gun perforators and when so used does not in any manner interfere with the operation of the well tool.

Another object is to provide a device which incorporates a novel liquid level indicator responsive to pressures incidental to nominal submergence, but which is not damaged by exposure to extreme pressures.

Further objects of the invention will appear hereinafter.

In the drawings:

Figure 1 is a partial sectional, partial elevational view of a gun perforator incorporating our sound detector and liquid level indicator.

Figure 2 is an enlarged sectional view of the housing unit containing our sound detector and liquid level indicator, said device being shown in elevation.

Figure 7 is a fragmentary wiring diagram showing another modified form of our liquid level indicator.

Figure 8 is a partial view of Figure 5 showing an alternate form of connection of the vibrator.

Figure 3:
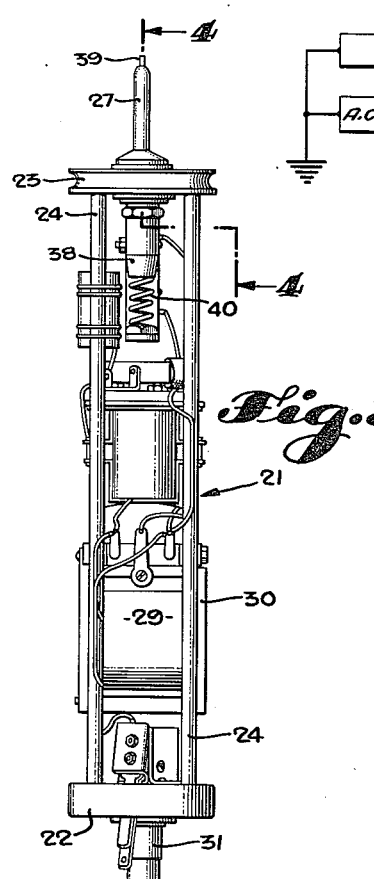
Figure 3 is an elevational view of our sound detector and liquid level indicator taken at right angles to Figure 2.

Our sound detector and liquid level indicator is particularly suited for use with a gun perforator. One type of gun perforator designated generally by 1 is shown in Figure 1 of the drawings. The gun perforator here illustrated comprises a cylindrical body having laterally directed gun units 2 each comprising a gun bore, a bullet, and a powder charge behind the bullet. The gun bores are intersected near their muzzle ends by a longitudinally extending passage in which is threaded a firing cord or detonator cord 3 adapted, when ignited, to create a pressure surge which drives the bullets backwardly against their respective propellant charges with sufficient force to detonate the propellant charges and expel the bullets.

The upper end of the gun perforator is provided with an externally threaded pin 4 having a socket 5 therein which is adapted to receive a detonator block 6 containing an electric detonator 7 to which is secured one or more firing cords 3. The firing block is held in place by a tubular housing 8 having a threaded socket at its lower end to fit the pin 4. Contact means 9 is contained in the lower portion of the housing 8 for electrical connection with the detonator 7. The contact means 9 includes an insulated terminal pin 10 projecting upwardly into the interior of the housing 8.

The upper end of the housing is screw threaded to a cable head body 11 having a terminal socket 12 therein electrically connected to the conductor core 13 of a cable 14 anchored to the cable head body 11.

The housing 8 is adapted to receive a sound detector unit 21 forming a part of our apparatus which also involves a liquid level indicator to be described hereinafter. The sound detector unit 21 fits within the bore of the housing 8 between the terminal pin 10 and the terminal socket 12. The sound detector unit includes a frame which comprises end plates 22 and 23 joined by rods 24 which serve to support the various devices comprising the sound detector unit. The lower end plate 22 rests on an internal shoulder 25 provided in the housing 8 and is provided with a slot which coacts with a pin 25a so that the frame may be oriented with respect to the housing.

Above the upper end plate 23, the housing is provided with an internal channel which receives a retainer ring 26. An insulated plug 27 extends upwardly from the end plate 23 for engagement with the terminal socket 12.

With reference to the wiring diagrams 5 and 6, the plug 27 is connected to the secondary coil 28 of a transformer 29, the core 30 of which is supported by the rods 24 of the detector unit frame. The remaining end of the secondary 28 is connected to a terminal socket 31 mounted on the lower end plate 22 and adapted to receive the terminal pin 10.

The terminal socket when connected to the terminal pin is connected to ground through one or more resistance wires (not shown) contained in the gun perforator detonator. A bypass connection to ground is provided by a resistor 32 connected between the secondary 28 and the terminal socket 31. A primary winding 34 of the transformer is connected in series with a microphone 35, a storage battery 36, and a switch 37, all suitably supported by the frame of the sound detector unit. It is preferred that one side of the microphone and the corresponding side of the switch 37 be grounded.

Figure 4:
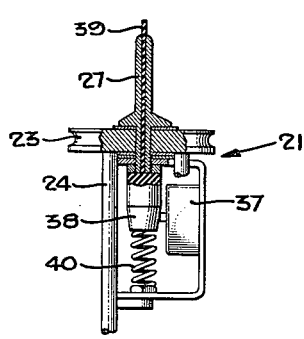
Figure 4 is a fragmentary sectional view through 4—4 of Figure 3.

In order to minimize depletion of the storage battery when the sound detector unit is not in use, a cam 38 of conical form is attached to a stem 39 extending upwardly through the plug 27 as shown best in Figure 4. The cam is normally held in an upper position by a spring 40. The stem 39 protrudes from the plug 27 and is adapted to be depressed when the plug is inserted in its socket 12. Thus, when the plug 27 and socket 12 are disconnected, the switch 37 is open, but when these members are connected the switch is automatically closed.

The conductor core of the cable is connected at its upper end to parallel circuits, one of which includes a blocking condenser 41 and receiver 42, and the other of which includes a firing switch 43, rectifier 44, and A. C. generator 45.

The current required for operation of the microphone is far less than that needed or required to fire the detonator. The firing current produced by the generator is preferably in the range of 400 to 600 volts at the surface. This rectified high voltage is prevented from damaging the receiver by the blocking condenser 41. On the other hand, small current required for operation of the sound detector is not sufficient to fire the gun perforator detonator.

Figure 5:
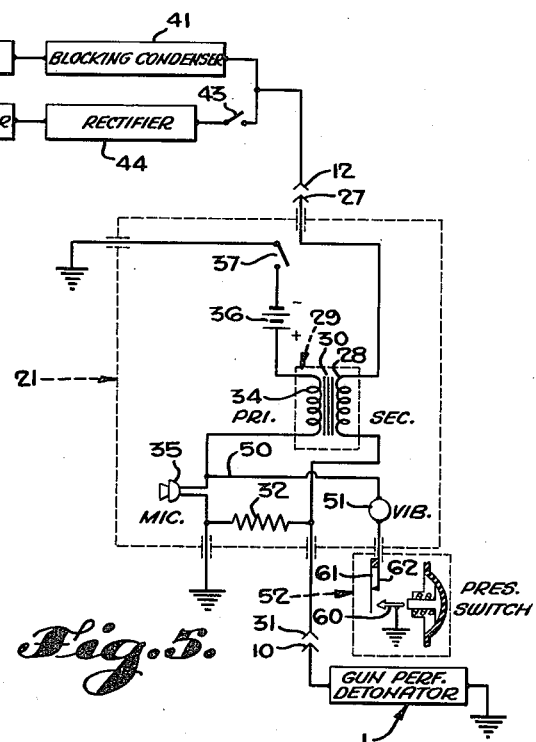
Figure 5 is a wiring diagram illustrating the manner in which the sound detector and liquid level indicator is incorporated with a gun perforator and its control circuit.

One form of the auxiliary warning system providing a liquid level indicating means forming a part of our invention includes, as shown in Figure 5, a shunt circuit 50 connected to the microphone circuit between the microphone 35 and the primary coil 34 of the transformer. An electro-magnetic vibrator 51 is connected in the circuit 50 and to a pressure switch 52. The pressure switch 52 is set into a recess 53 provided in the side wall of the housing 8. The pressure switch includes a threaded shank 54 adapted to be mounted in the wall of the housing 8 behind the recess 53, and a flange 55 exposed in the recess 53. The shank 54 slidably receives a stem 56, the outer end of which is provided with a head 57, and is held in an outer position by a spring 59. The head 57 is covered by a diaphragm 58 of yieldable material, the margins of which are held by the periphery of the flange 55. The head 57 and the flange 55 are so formed that when the head 57 is depressed, complete support for the diaphragm 58 is afforded by the head 57 and the flange 55.

The inner end of the stem 56 engages a grounding contact 60 when the stem moves inward a predetermined minimum distance. The grounding contact engages a contact spring 61 under urge of the stem 56. The contact spring 61 is normally in engagement with a contact element 62 electrically connected with the vibrator 51. Continued movement of the stem 56 causes the grounding contact 60 to move the contact spring 61 away from the contact element 62, thereby to open the circuit through the vibrator 51.

Figure 6:
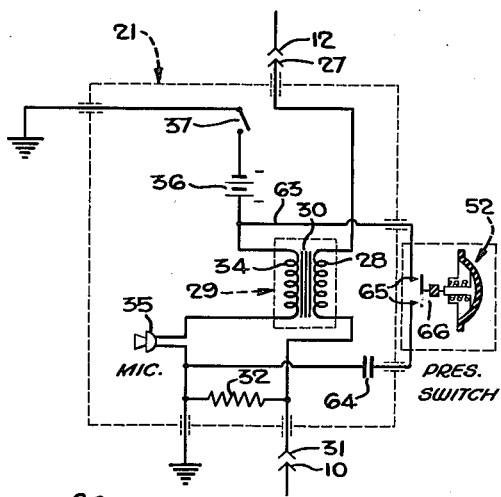
Figure 6 is a fragmentary wiring diagram showing a modified form of our liquid level indicator.

Reference is directed to Figure 6. In the auxiliary warning system herein illustrated, a shunt circuit 63 is connected across the primary 34 of the transformer and the microphone 35. Located in the shunt circuit 63 is a condenser 64 and spaced contacts 65 adapted to be connected by a bridging contact 66. The bridging contact 66 is adapted to be mechanically engaged by the stem 56 of the pressure switch, but is electrically insulated therefrom.

Figure 7 shows an auxiliary warning system comprising a resistor 70 connected in series between the microphone 35 and ground, the switch 52 being connected across said resistor by means of the shunt circuit 71, 72.

Operation of our sound detector and liquid level indicator is as follows:

When the device is assembled in the housing 8 and the gun perforator connected with the suspension cable, the switch 37 is closed and a constant battery voltage is impressed on the microphone which is preferably of the carbon pile type. In the absence of any noise, no appreciable current flows through the circuit because of the high resistance of the carbon pile in the microphone. Vibration of the microphone diaphragm by sound, however, causes the carbon pile to vary its resistance and thereby modulate the current passing through the primary coil 34 of the transformer 29. This fluctuating current in the primary coil of said transformer produces an audio-frequency A. C. current in the secondary coil 28 of said transformer of a higher voltage. The signal thus produced is transmitted through the conductor core of the cable to the surface where it is converted by the receiver and an associated head phone or loud speaker to a signal audible to the operator.

If the circuit shown in Figure 5 is employed, the pressure operated switch closes the circuit through the vibrator 51 upon submergence in liquid a predetermined distance, for example, five feet. Grounding of the circuit 50 through the vibrator produces an intermittent D. C. flow through the primary coil 34 of the transformer. The resistance of the vibrator is relatively low compared to that of the microphone 35. Consequently, the signal produced at the surface by the vibrator is considerably stronger and different in character from that produced by the microphone so as to be readily noticeable to the operator. The signal produced by the vibrator differs from the microphone by the fact that the vibrator produces a uniform tone, whereas the sounds picked up and transmitted by the microphone are non-uniform.

As the gun perforator continues its descent, the submergence pressure acting on the pressure switch increases until the pressure switch opens the circuit through the vibrator. This may occur at a depth from 10 to 15 feet. By this arrangement, a distinctive sound is produced as the gun perforator enters or is withdrawn from the liquid.

It should be observed that alternatively the shunt circuit may be connected between the primary 34 of the transformer and the battery, as indicated in Figure 8, in which case the sound produced by the vibrator is picked up by the microphone and is detected at the surface by the operator by reason of the uniformity of tone.

If the circuit shown in Figure 6 is used, the condenser 64 functions to change the character of the tone, for example, the pitch of the tone. Thus, when the condenser is in the circuit the tone will be lower than that produced when the condenser is out of the circuit, taking the circuit shown in Figure 6. Conversely, if the condenser 64 be placed in series with the microphone 35, the tone would be higher. As a result, the tone of the signals produced by the microphone is changed upon submergence of the pressure operated switch and remains changed as long as the switch is submerged.

In the circuit shown in Figure 7, the resistor 70 functions to limit the passage of current through the microphone 35 until the pressure switch 52 is submerged, whereupon contacts 65 are closed, shunting out this resistor by means of shunt circuit 71, 72. Thus, submergence of switch 52 causes a sharp and distinguishable increase in the amplitude of the output signals from the microphone and a corresponding increase in volume of the output of the surface receiver 42.

It is also obvious that in the diagram of Figures 6 and 7, switch 52 may be arranged so that it is originally closed and subsequently opened upon submergence. In the case of Figure 6, the condenser 64 would then be cut out of the circuit upon submergence, raising the tone of the signals received at the surface; in Figure 7 the resistance 70 would then be cut in, lowering the volume of the signals received at the surface.

While there has been described what is at present considered the preferred embodiments of the present invention, it will be apparent to those skilled in the art that various modifications and changes may be made without departing from the essence of the invention, and it is intended to cover herein all such modifications and changes as come within the true scope and spirit of the appended claims.

We claim:

1. A sound detector unit and liquid level indicator for a conductor cable supported tool for a well comprising: a sound detector unit connected through an electric coupling to said conductor cable providing during the presence of said tool in said well a signal continuously indicating conditions in said well; a pressure operated switch operable during submergence of said well tool below a predetermined liquid level in said well; a signal volume altering element; electrical circuits including said sound detector unit, said switch and said signal volume altering element arranged to effect, upon operation of said switch, a distinctive alteration in the volume of said signal; and a receiver connected to said conductor cable at the well surface, said receiver being responsive through said conductor cable to said signal from said sound detector unit, and said receiver being responsive to said alteration of said signal during operation of said switch.

2. A sound detector unit and liquid level indicator for a conductor cable supported tool for a well comprising: a sound detector unit connected through an electric coupling to said conductor cable providing during the presence of said tool in said well a signal continuously indicating conditions in said well; a pressure operated switch operable during submergence of said well tool below a predetermined liquid level in said well; a resistance element; electrical circuits including said sound detector unit, said switch and said resistance element arranged to effect, upon operation of said switch, a distinctive alteration in the volume of said signal; and a receiver connected to said conductor cable at the well surface, said receiver being responsive through said conductor cable to said signal from said sound detector unit, and said receiver being responsive to said alteration of said signal during operation of said switch.

3. A sound detector and liquid level indicator for a conductor cable supported tool for a well comprising: a sound detector unit connected through an electric coupling to said conductor cable providing during the presence of said tool in said well a signal continuously indicating conditions in said well, said sound detector unit including a power supply and a microphone; a pressure operated switch operable during submergence of said well tool below a predetermined liquid level in said well; electrical circuits including said sound detector unit and said switch, said electrical circuits effecting, upon operation of said switch, a distinctive alteration in the volume of said signal produced by said sound detector unit, said electrical circuits including a shunt circuit whereby upon operation of said switch, a resistor, normally an element of said electrical circuits, is shunted out by said shunt circuit; and a receiver connected to said conductor cable at the well surface, said receiver being responsive through said conductor cable to said signal from said sound detector unit, and said receiver being responsive to said alteration in the volume of said signal during operation of said switch.

HARRY A. MATHEWS.
MATHEW B. RIORDAN, JR.
LYLE B. SCOTT.

REFERENCES CITED

The following references are of record in the file of this patent:

UNITED STATES PATENTS

| Number | Name | Date |
| --- | --- | --- |
| 478,791 | Gardner | July 12, 1892 |
| 1,743,711 | Field | Jan. 14, 1930 |
| 1,822,203 | Collins | Sept. 8, 1931 |
| 2,361,458 | Converse | Oct. 31, 1944 |
| 2,396,935 | Walstrom | Mar. 19, 1946 |
| 2,436,047 | Martin | Feb. 17, 1948 |
| 2,439,502 | Tate | Apr. 13, 1948 |